May 29, 1945.   J. B. VAN DER WERFF   2,377,115
PRESSURE REGULATING SELECTOR VALVE
Filed Sept. 29, 1941   4 Sheets-Sheet 1
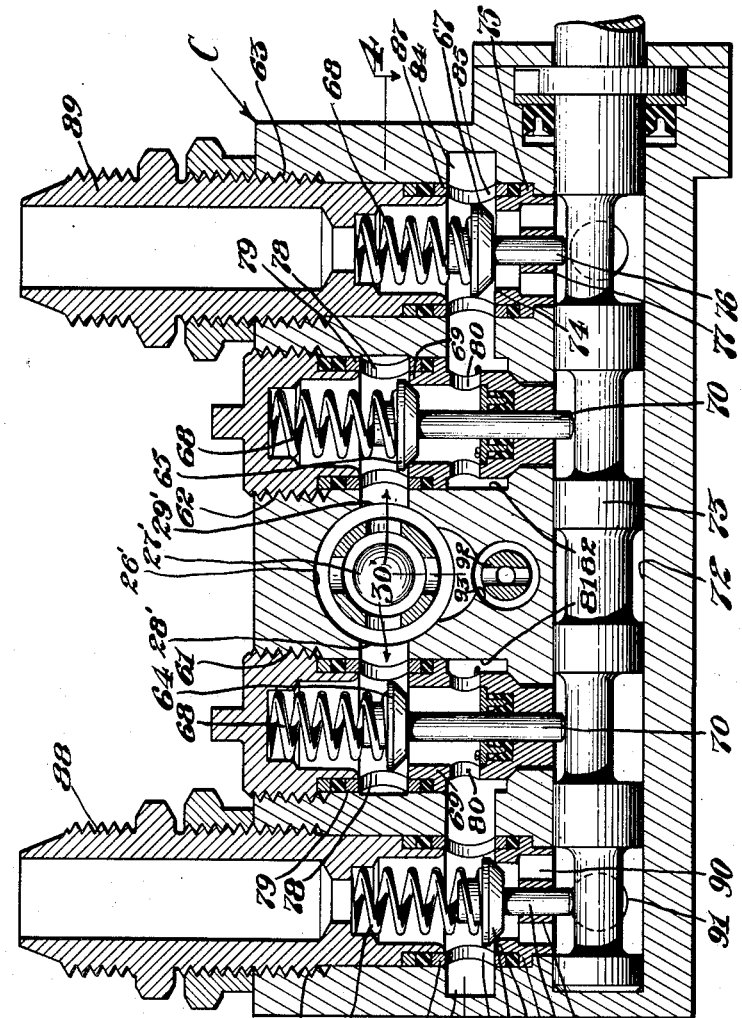
Inventor
Jacob B. Van Der Werff.
By R. S. Berry
Attorney

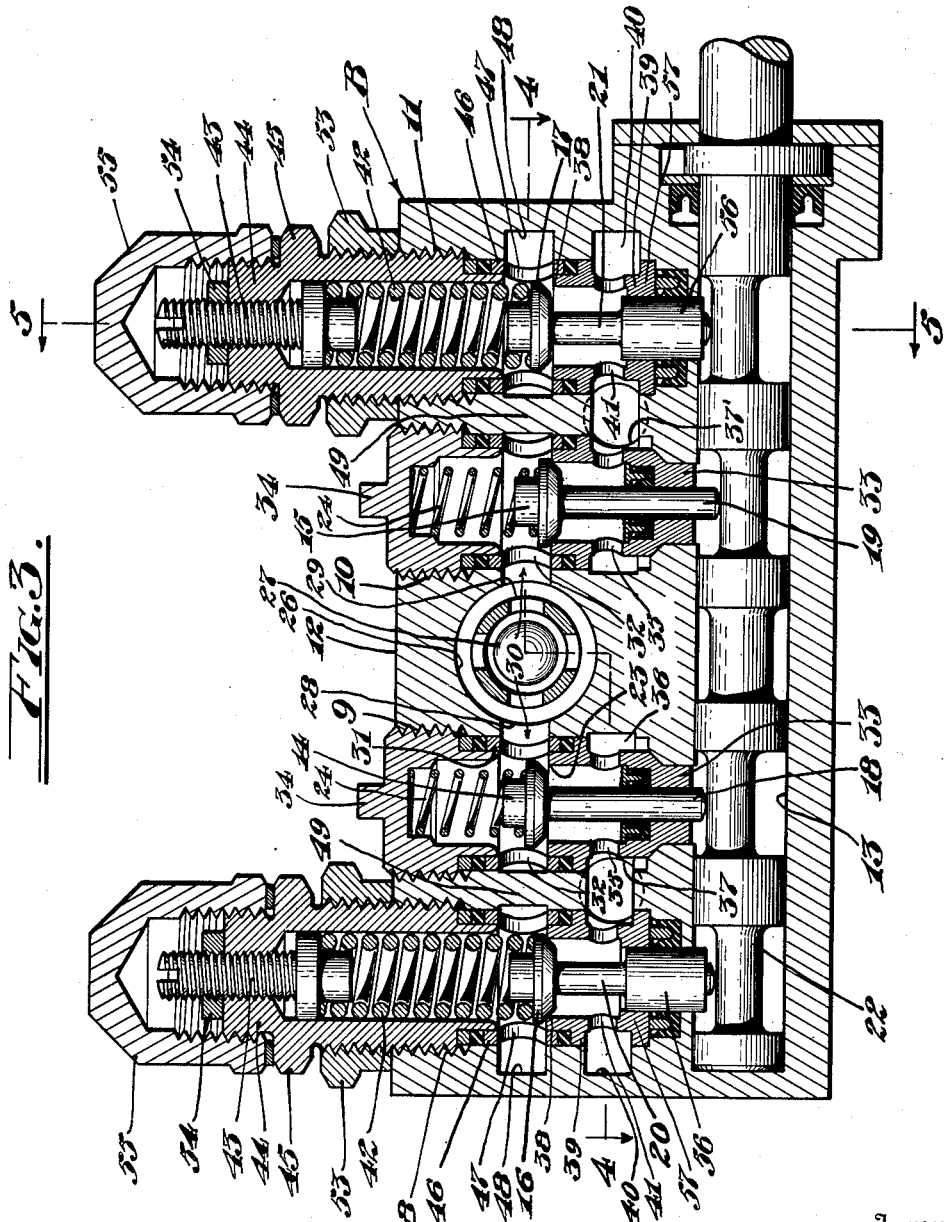

May 29, 1945.  J. B. VAN DER WERFF  2,377,115
PRESSURE REGULATING SELECTOR VALVE
Filed Sept. 29, 1941   4 Sheets-Sheet 3
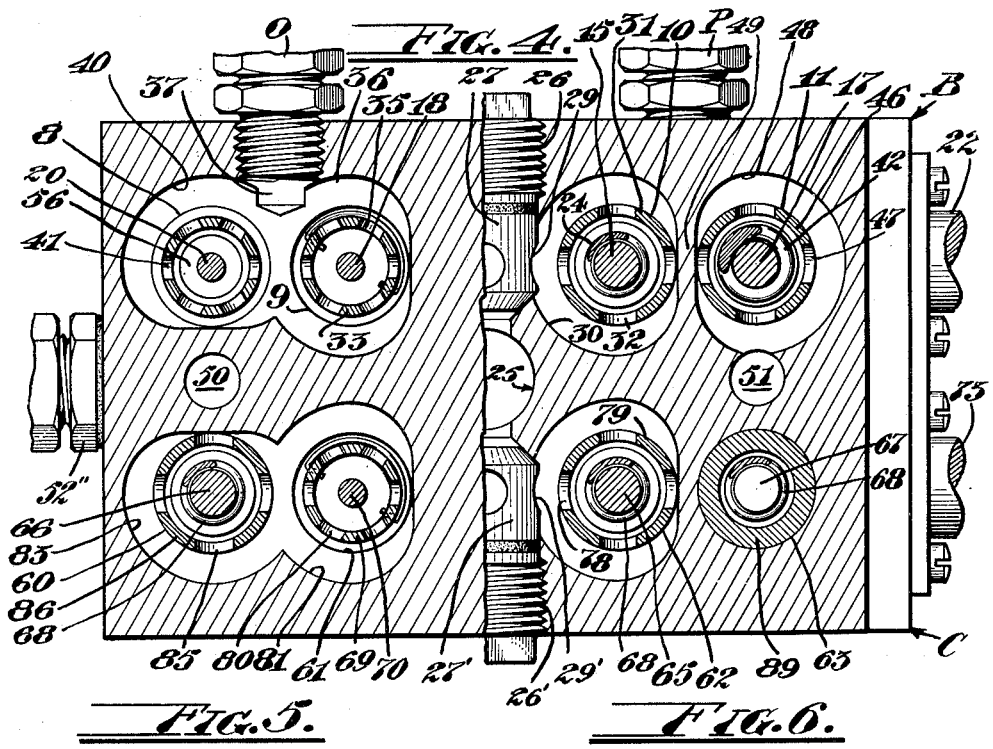
Inventor
Jacob B. Van Der Werff.
By R. S. Bury
Attorney Patented May 29, 1945

2,377,115

UNITED STATES PATENT OFFICE 2,377,115

PRESSURE REGULATING SELECTOR VALVE

Jacob B. Van Der Werff, Pasadena, Calif., assignor to Adel Precision Products Corp., a corporation of California Application September 29, 1941, Serial No. 412,703

11 Claims. (Cl. 121—46.5)

This invention relates in general to hydraulic systems for actuating the landing gear, control flaps, brakes, bomb doors and similar equipment in aircraft and more particularly resides in the provision of a 4-way selector valve which through an automatic fluid pressure response of certain of the 4-way valve members thereof will control the flow of the fluid so that separate jacks in the same system may be operated under different pressures.

It should be noted that a flow control such as above described is highly desirable in systems wherein certain of the aircraft borne devices or controls actuated by separate jacks in the same hydraulic system require operation at different rates of movement or under different hydraulic pressures from other of the jack operated devices or controls. As an example, the landing gear jacks may require an operating pressure of 600 pounds per square inch to attain a desired rate of movement whereas the jacks for the landing flaps may require a pressure of 1000 pounds per square inch to attain a desired rate of movement. Moreover the differential fluid capacities of the jack cylinders as is usually the case in hydraulic systems of the types herein referred to, make such flow control highly desirable to insure proper response and reliability of performance at predetermined equal or unequal rates of movement of the jack pistons depending on the requirements of the particular jacks.

In systems of the type to which this invention relates the pump must necessarily have a flow capacity sufficient to supply the largest cylinder in the system at its slowest permissible speed, and this capacity may be too great for some of the smaller cylinders in the system if it is desired to limit their rate of movement below the rate of flow of the pump.

The conventional method of control of piston rate of movement is by the installation of relief valves in each of the cylinder lines of the cylinder whose motion it is desired to retard. The relief valves are adjusted to bypass to the reservoir that portion of the pump flow which will insure the desired rate of cylinder motion. It can be seen that the use of one relief valve in the pressure line to the selector valve would be impractical since it would permit the whole system to relieve at its pressure setting. Furthermore, the use of flow restrictors in the particular branch of the system is also impractical since it would merely result in an increase in pressure rather than a decrease in flow and thus cause the automatic unloading valve to rapidly cut in and out creating a fluid hammer condition destructive to the mechanism and causing a jerky motion of the piston. It is a purpose of the present invention to improve such systems through the instrumentality of a selector valve in which certain of the selectively operable valves thereof, for example the return valves, in addition to their normal function take the place of said relief valves thereby reducing plumbing and installation costs and overcoming the above noted objections.

Another object of my invention is to provide a selector-flow governor valve such as described wherein the return valves will operate at all times to relieve predetermined undesirable pressure on the piston of the jack controlled thereby whether said undesirable pressure is caused by externally applied loads such as drag or wind pressure as on the landing flaps etc., or by the pump or thermal expansion of the fluid thereby making it unnecessary to use separate thermal relief valves.

Another object of my invention is to provide a 4-way control flow governor valve which as far as directional control of the fluid is concerned will operate in the same manner as a conventional selector 4-way valve and in addition will permit the return valves thereof to open under predetermined pressure, depending on the setting of regulatory springs employed to close them, and by-pass into the return or reservoir lines, that portion of the pump flow which is in excess of that required for the jack which is to be operated at a rate of movement below the flow rate of the pump.

Another object of my invention is to provide a multiple valve assembly wherein a plurality of 4-way control valve units are housed in a single body, with one of such 4-way units having its return valves arranged to serve also as automatic flow governor valves whereby separate jacks are subject to independent control and under different flow rates with greater convenience and facility and a saving in material, parts and weight compared to systems having separate relief and control valves in separate housing or bodies.

A further object is to provide a selector valve such as described which in addition to permitting of piston movement rates lower than is ordinarily consistent with pump flow rates, makes possible the limiting of the pressure in any one of the jack cylinders (whether the largest or the smallest in the system) to a maximum value below the "cutout" or "unloading" pressure of the usual unloading valve employed in such system.

With the foregoing objects in view together with such other objects and advantages as may subsequently appear, the invention resides in the parts, and in the combination, construction and arrangements of the parts hereinafter described and claimed and illustrated by way of example in the accompanying drawings in which:

Fig. 1 is a fragmentary perspective view of a valve assembly embodying my invention;

Fig. 2 is a longitudinal sectional view taken on the line 2—2 of Fig. 1, showing the 4-way control valve unit of the assembly;

Fig. 3 is a longitudinal sectional view taken on the line 3—3 of Fig. 1, showing the flow governor-4-way control valve unit of the assembly;

Fig. 4 is a sectional view taken on the line 4—4 of Figs. 2 and 3;

Fig. 5 is a cross sectional view taken on the lines 5—5 of Figs. 1 and 3;

Fig. 6 is a cross sectional view taken on the line 6—6 of Fig. 1;

Figure 7:
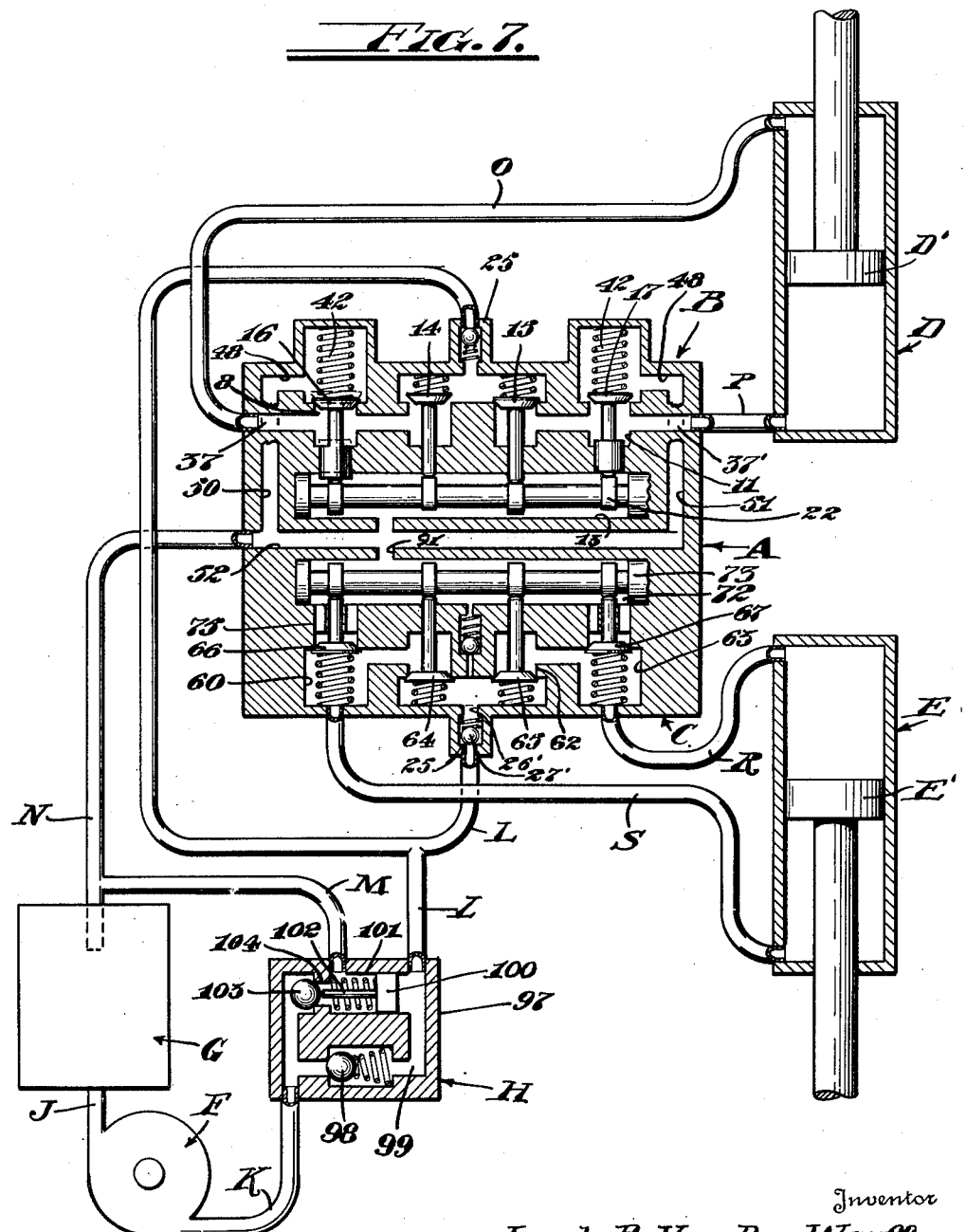
Fig. 7 is a diagrammatic view of a hydraulic system embodying my invention.

One embodiment of my invention as generally shown in Fig. 1 includes an elongated valve body A of a size to accommodate a plurality for example of two 4-way poppet valve units B and C respectively which are adapted as diagrammatically shown in Fig. 7 to control separate hydraulic jacks D and E in the same hydraulic system. Such a system (Fig. 7) primarily includes a constant displacement (continuously driven) pump F, a reservoir G, an automatic pressure unloading valve H and the usual pressure and return lines, and will be hereinafter more fully described.

Inasmuch as the primary purpose of my invention is to provide a 4-way control valve in which the selectively operable return valve members also serve as automatic relief valves to control the flow of fluid whereby separate jacks in the same system may be operated under different flow notes it is apparent that such a system requires a 4-way valve for each jack and I have therefore provided for housing the plurality of such 4-way valves in one body or block to save space and material, weight and installation costs and conveniently group the control valves. However it is obvious that my combined 4-way selector and flow control valve may if desired be embodied in a separate body from the other control valve or valves used in the system.

The flow control provisions of this invention are embodied in the valve unit B, best shown in Fig. 3, in which the valve body A has four valve receiving bores 8, 9, 10 and 11 arranged in line. The outer ends of these bores open through the upper surface 12 of the valve body while the inner ends of said bores open into a cam shaft receiving bore 13 extending longitudinally into the body through one end thereof.

In the bores 9 and 10 are pressure valves 14 and 15 for controlling the flow of operating fluid to opposite ends of a hydraulic jack such as the one D in Fig. 7, whereas in the bores 8, and 11 are return valves 16 and 17 for controlling the return flow from the jack to the reservoir. Stems 18 and 19 on the pressure valves 14 and 15 and stems 20 and 21 on the return valves 16 and 17 are disposed to be engaged with a cam shaft 22 in the bore 13 in such manner that valves may be selectively opened as will be hereinafter more fully described.

The pressure valves 14 and 15 are identical as to construction and each is arranged to be urged against its seat 23 by a spring 24 and the pressure of the operating fluid. As shown in Figs. 4 and 6, fluid under pressure enters the valve body A through a central intake passage 25 opening at the upper surface of said body and passes into a lateral passage 26 having a check valve 27 arranged therein to prevent back-flow of fluid toward the pump. The passage 26 (see Fig. 3) has ports 28 and 29 on opposite sides thereof opening into annular enlargements 30 of the valve bores 9 and 10. Mounted in the bores 9 and 10 are cylindrical sleeves 31 which have radial ports 32 located so that the pressure fluid will pass into said sleeves and urge the valves 14 and 15 against their seats. These sleeves hold in place tubular seat members 33 on the outer ends of which the seats 23 are provided. Closure caps 34 are screwed into the outer ends of the bores 9 and 10 for holding the sleeves 31 and seat members 33 in said bores. The springs 24 are interposed between the caps 34 and the valves 14 and 15 for urging the valves toward their seats.

When the valves 14 and 15 are open the pressure fluid passes through the bores of the seat members thereof and out through radial ports 35 provided intermediate the ends of said seat members, into enlargements 36 in the bores 9 and 10. Passages 37 and 37' extend from the enlargements 36 through the adjacent side of the body A and provide for connection with pressure lines to opposite ends of a jack cylinder.

The return valves 16 and 17 as shown in Fig. 3 co-operate with seats 38 on the outer ends of tubular seat members 39 corresponding to seat members 33. In this connection it should be noted that the seats of the pressure and return valves are in the same plane, for the purpose which will be apparent as the description hereof progresses.

The enlargements 36 in the bores 9 and 10 intersect and therefore are in communication with similar enlargements 40 of the bores 8 and 11 as shown in Figs. 3 and 4, whereby pressure fluid will enter the enlargements 40 and pass through ports 41 in the seat members 39 into the bores of the seat members beneath the return valves 16 and 17. In this manner the valves 16 and 17 are arranged to be seated against the pressure fluid passed by either of the pressure valves 14 and 15 for introduction to either end of the jack cylinder.

Springs 42 hold the valves 16 and 17 seated, said spring being disposed between said valves and adjustable screws 43 threaded in the closed ends 44 of closure caps 45 in turn screwed into the outer ends of the bores 8 and 11. The screw caps 45 abut sleeves 46 which hold the seat members 39 in place. These sleeves have radial ports 47 above the seats for the valves 16 and 17 whereby when said valves are opened fluid will flow through said sleeves, the ports 47 and enter enlargements 48 of the bores 8 and 11 as shown in the upper part of the right half of Fig. 4. As shown in Fig. 3, the enlargements 48 in bores 8 and 11 are in the same plane as enlargements 30 in bore 9 and 10 but are spaced apart by a partition 49 (see Fig. 4).

Referring to Figs. 4 and 5 it is seen that the enlargements 48 intersect vertical passages 50 and 51 which lead into a longitudinal passage 52 paralleling the cam shaft bore 13. A lateral passage 52' connects passage 13 with passage 52 and the latter has an outlet 52" for returning fluid to the reservoir in the hydraulic system as will be hereinafter explained. The pasage 52' serves to convey fluid which may have leaked into the passage 13, to the return line.

The screw caps 45 are held by lock nuts 53 while the screws 43 are held by similar lock nuts 54.

Cover caps 55 are removably mounted on the outer ends of the caps 45 and enclose the outer ends of the screws 43. This arrangement makes possible the required adjustment to regulate the tension of the springs 42.

These springs must be regulated so that they will hold the valves 16 and 17 seated against the fluid under a predetermined working pressure required for the desired operation of the jack in the system controlled by the selector valve unit B hereof such pressure being below the normal pump pressure, but will permit the valves to open at pressures in excess of said predetermined working pressure.

To reduce hydraulic load on the springs for the said valves are counter-balanced by means of piston portions 56 on the stems 20 and 21 thereof, said piston portion working in the lower cylinder like ends 57 of the seat members 39. This makes possible the use of light springs and a lower handle load when the poppet valves are lifted against the springs.

Before describing the operation of the 4-way selector pressure regulation valve unit B of my invention it is deemed best to describe the 4-way selector valve unit C which in the present instance is embodied in the same housing or body as the valve unit B. Figs. 1, 2, 4, 5 and 6 show the construction of the unit C and its relation to the unit B.

The block or body A has four valve receiving bores in line and designated 60, 61, 62 and 63. Pressure valves 64 and 65 are mounted in the bores 61 and 62 while return valves 66 and 67 are mounted in the bores 60 and 63. These valves are of the poppet type and are pressure and spring seated, each valve having a spring 68 for such purpose.

It is now apparent that the main distinction between the two-4-way valve units B and C is the unit B has pressure seated pressure valves 14 and 15 and spring seated return valves 16 and 17 seating against fluid pressure whereas each of the four valves in the unit C is primarily pressure seated.

The pressure valves 64 and 65 of unit C are identical and each seat against a seat on a tubular seat member 69 and has a stem 70 guided by means of the lower closed end of the seat member so as to extend into a cam shaft bore 72 corresponding to the one 13 for the unit B. The cam shaft 73 in the bore 72 cooperates with the valve stems 70 for selectively opening the valves 64 and 65.

The return valves 66 and 67 for unit C are arranged to engage seats 74 on short tubular seat members 75 in the bores 60 and 63 and each return valve has a stem 76 mounted in a guide 77 in the seat member and disposed to engage the cam shaft 73. The cam shaft 73 is arranged so that a selected pressure and a selected return valve may be simultaneously opened, while the other pressure and return valves remain closed.

Pressure fluid entering the valve body A through passage 25 flows as shown in Fig. 6 into a lateral passage 26′ corresponding to passage 26, past a non-return check valve 27′ corresponding to check valve 27. The passage 26′ has side ports 28′ and 29′ opening into enlargements 30′ of the bores 61 and 62. Fluid in the enlargements 30′ passes through radial ports 78 in sleeves 79 and tends to seat the valves 64 and 65. When the valves 64 and 65 are open the fluid flows into the seat members 69 thence through radial ports 80 in the seat members 69 and into enlargements 81 and 82 of the bores 61 and 62. As the enlargements 81 and 82 in the bores 61 and 62 intersect and thence are connected with similar enlargements 83 and 84 of the bores 60 and 63 respectively the pressure fluid will enter the enlargements 83 and 84 and pass therefrom through radial ports 85 in sleeves 86 and 87 in the bores 60 and 63 above the return valves 66 and 67 and discharges through tubular fittings 88 and 89 screwed into the bores 60 and 63. These fittings extend through the top of the body A and provide for conducting fluid to and from the jack controlled by the valve unit C. Fluid returning to the unit C from the jack through either of the fittings 88 and 89 will flow past the open one of the two return valves 66 and 67 (the companion pressure valve being then closed) through the particular tubular seat member 75.

The seat members 75 have axial passages 90 through which return fluid will discharge into the cam shaft bore 72, thence through a lateral passage 91 (see Fig. 5) into the return passage 52 whence the fluid is returned to the reservoir.

It is now apparent that the return passage 52 serves alike for the two 4-way valve units B and C housed in the single body A and that the intake passage 25 serves both valve units in like manner whereby to effect a saving in manufacturing costs.

A thermal relief valve 92 is provided in the body A and is subject to regulation to open at predetermined pressure above the normal pump pressure for example at 1300 pounds per square inch where the normal pump pressure is approximately 1000 pounds per square inch. The valve 92 is particularly shown in Fig. 6 mounted in a transverse bore 93 extending through the body A and controls the thermal relief passage 94 leading from the passage to the return passage 52. A spring 95 holds the valve 92 seated against the pressure of the fluid in the system and is regulated as to tension by the adjusting means 96.

*Operation*

Assuming that a valve assembly such as shown in Fig. 1 having the two 4-way control valve unit B and C and in the one body A, is employed in a hydraulic system such as shown diagrammatically in Fig. 7 it is seen that the hydraulic jack D is under control of the 4-way valve unit B while the hydraulic jack E is controlled by the 4-way valve unit C.

In the system as shown in Fig. 7 the jack D is arranged to operate at a lower pressure than that required for the desired operation of the jack E and consequently the 4-way valve unit B is provided with the flow governor characteristics of the present invention while the valve unit C is of the ordinary 4-way type.

Beginning with the reservoir G it is seen that a fluid supply line J leads therefrom to the pump F and that a pressure line K leads from the pump to the unloading valve H. From the valve H a pressure line L leads to the common intake passage 25 in the body. Fig. 7 diagrammatically shows the line L as breached to separate intakes for the sake of clarity of illustration.

Pressure fluid entering the valve body 97 of valve H opens the check valve 98 in the passage 99 and passes into the line L. When the pressure valves 14, 15, 64 and 65 are closed the pressure fluid in the passage 99 is effective to move a piston 100 in a bore 101 in the body 97 whereby a pin 102 on said piston will unseat the check valve 103 and allow the pressure fluid to "unload" through a relief passage 104, into a return line M leading to the main return line N which latter extends from the return passage 52 in the valve body A to the reservoir G. This makes possible a continuously operated (airplane engine driven) pump inasmuch as the fluid is circulated freely through the pump reservoir, unloading valve and fluid lines J, K, M and N when the aforesaid pressure valves are closed.

Assuming the pump pressures to be 1000 pounds per square inch and jack D controlled by the valve unit B is to be operated at a pressure of 600 pounds per square inch and that the jack E requires a pressure of 1000 pounds per square inch, the springs 42 are tensioned to allow the return valves 16 and 17 of the unit B to open at a pressure of approximately 600 pounds per square inch.

Upon now opening the pressure valve 14 as shown in Fig. 3 the operating fluid at 1000 pounds per square inch (pump pressure) flows through the seat member 33, ports 35, enlargements 36 and 40 of bores 9 and 8 respectively (see Figs. 3 and 4) and out through passage 37 to the pressure line O (Fig. 7) leading to the upper end of the jack D.

As soon as the operating fluid at pump pressure enters bore 8 it is effective against the return valve 16 which is set to open at pressure at and above 600 pounds per square inch, said relief valve being immediately opened as indicated by dotted lines in Fig. 7 whereby the pump flow in excess of that required to operate the jack D will be relieved to the reservoir. The fluid thus relieved past the valve 16 will flow into the enlargement 48 of the bore (see Fig. 5) thence through vertical passage 50 into return passage 52 and return line N as shown in Fig. 7. This by-passing of the excess flow into the system takes place while the operating fluid is actuating the jack D as here shown to retract the plunger D' thereof. The return fluid from this jack is handled in the usual manner in that it passes through line P to the other passage 37' in body A into bore 11 past the open return valve 17, through enlargement 48 in the bore 11, vertical passage 51, thence into return passage 52 and return line N.

In this connection it should be noted that the cam shaft operates to simultaneously open the valve 14 and 17 to retract the jack plunger D' and to simultaneously open valves 15 and 16 when the jack plunger is to be extended, as will be apparent in Fig. 7.

When the pressure valve 15 is opened for the purpose of extending the plunger D' of the jack D, the return valve 16 is also opened and the operating fluid passes through the seat member 33 for valve 15 through the ports 35 into intersecting bores 36 and 40 and passage 37' out through line P to the lower end of the jack. The return valve 17 is now closed but opens when the pressure in the bore therefor exceeds 600 pounds per square inch and thus allows the fluid in excess of that required for the jack D to return to the reservoir in the same manner as previously described in connection with the valve 16. As the return valve 16 is held opened by the cam shaft while pressure valve 15 is likewise opened, the return fluid from the top of the jack D flows through line O, passage 37, enlargements 36 and 40 of bore 8 past valve 16, into enlargements 48 of bore 8, vertical passage 50, thence into return passage 52 and return line N to the reservoir.

It is now apparent that the selector and control functions of the valve unit B afford the desired operation of jack D at will while at the same time automatically by-passing into the system the pressure fluid in excess of that required for operating jack D. It is important to note that the valve unit B of my invention affords the advantages as follows:

1. Simplicity and light weight
    (a) elimination of two separate relief valves and necessary plumbing and mounting problems.
    (b) requires only a few simple parts in addition to the conventional 4-way valve.
2. May be used to control pressures acting on pistons whether caused by externally applied loads or by the pump with the pressure valves either open or closed.
3. May be used to control piston motion rates.
4. Eliminates need for thermal expansion relief valves in hydraulically locked systems.

When the jack E is to be operated, the valve unit C which is conveniently disposed for controlling such operation, is actuated like the conventional 4-way selector valve. For example when the pressure valve 65 is opened by means of the cam shaft 73 the return valve 66 is also opened and the pressure fluid will be effective through line L and the common intake passage 25 in the valve body A. In this connection it should be noted that the unloading valve H operates in the same manner for valve unit C as for valve unit B, being common to said valves. As the pressure fluid enters through the intake passage 25 it flows into lateral passage 26', opens check valve 27' and passes through side port 29' into enlargement 30' of bore 62, past the then open valve 65 in bore 62, through the seat member 69 for valve 65, the ports 80 in said seat member, the enlargement 82 of bore 62, the enlargement 84 of bore 63 intersecting enlargement 82, ports 85 in sleeve 87 in bore 63, over top of return valve 67 (then closed), then upwardly through fitting 89 into line R to top of jack E. This causes the plunger E' of jack E to be extended.

The return flow from the lower end of the jack E flows through line S fitting 88, sleeve 86 in bore 60, past valve 66 then open, through seat member 75 for valve 66, into cam shaft bore 72 thence through lateral passage 91 (see Fig. 5) into return passage 52 thence to the reservoir through line N.

To retract the plunger E' of jack E, the cam shaft 73 is turned to open valves 64 and 67 wherefore pressure fluid flows through line S to the lower end of the jack and return fluid flows from the upper end of the jack through line R. This will be readily understood with reference to the diagram in Fig. 7.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a combined control and flow governor valve for use in a hydraulic system including a fluid pump, a reservoir and separate hydraulic jacks, a valve body having fluid passages, pressure seated poppet valves in certain of said passages for controlling the flow of pressure fluid from said pump to the ends of one of said hydraulic jacks, return valves movable independently of said pressure seated valves and mounted in said body to seat against the fluid pressure in other of the passages and arranged to be selectively opened for controlling the return flow of fluid from the ends of said one jack and to open automatically as relief valves independently of said pressure seated valves, means for selectively operating the pressure and return valves including a cam shaft engaging each of said valves, and spring means for seating said return valves arranged to yield at a predetermined pressure whereby said return valves may open as relief valves independently of said pressure seated valves to return a part of the operating fluid to the reservoir.

2. In a combined control and flow governor valve for use in a hydraulic system including a fluid pump, a reservoir and separate hydraulic jacks, a valve body having fluid passages, pressure seated poppet valves in certain of said passages for controlling the flow of pressure fluid from said pump to the ends of one of said hydraulic jacks, return valves movable independently of said pressure seated valves and mounted in said body to seat against the fluid pressure in other of the passages and arranged to be selectively opened for controlling the return flow of fluid from the ends of said one jack also to open automatically as relief valves independently of the positions of said pressure seated valves, means for selectively operating the pressure and return valves including a cam shaft directly engaging each of said valves, and spring means for seating said return valves arranged to yield at a predetermined pressure whereby said return valves independently of said pressure seated valves, may open as relief valves to return a part of the operating fluid to the reservoir.

3. In a combined control and flow governor valve for use in a hydraulic system including a fluid pump, a reservoir and separate hydraulic jacks, a valve body having fluid passages, pressure seated poppet valves in certain of said passages for controlling the flow of pressure fluid from said pump to the ends of one of said hydraulic jacks, return valves movable independently of said pressure seated valves and mounted in said body to seat against the fluid pressure in other of the passages and arranged to be selectively opened for controlling the return flow of fluid from the ends of said one jack and to be automatically opened as relief valves independently of said pressure seated valves, means for selectively operating the pressure and return valves, and spring means for seating said return valves arranged to yield at a predetermined pressure whereby said return valves may operate independently as relief valves and return a part of the operating fluid to the reservoir.

4. In combined control and flow governor valve for use in a hydraulic system including a fluid pump, a reservoir and separate hydraulic jacks, a valve body having fluid passages, pressure seated poppet valves in certain of said passages for controlling the flow of pressure fluid from said pump to the ends of one of said hydraulic jacks, return valves movable independently of said pressure seated valves and mounted in said body to seat against the fluid pressure in other of the passages and arranged to be selectively opened for controlling the return flow of fluid from the ends of said one jack and to open automatically while said pressure seated valves remain stationary, means for selectively operating the pressure and return valves, and spring means for seating said return valves arranged to yield at a predetermined pressure whereby said return valves will open as relief valves and return a part of the operating fluid to the reservoir while said pressure seated valves are closed as well as when said pressure seated valves and said return valves are selectively opened by said operating means.

5. In a pressure regulating selector valve for a hydraulic system in which separate jacks are connected with a pump and reservoir for independent operation at different fluid pressures, a valve body having fluid passages, pressure seated poppet valves mounted in said body for controlling the flow of pressure fluid through certain of said passages to a jack in the system, return valves in said body for controlling the flow through certain of said passages of fluid which is returned from said jack to the reservoir and arranged to open automatically while said pressure seated valves remain seated, cam means common to and for selectively engaging and operating said pressure and return valves so that selected pressure and return valves are simultaneously opened, said return valves being mounted to seat against the fluid pressure in said body, and spring means for seating said return valves, said spring means yielding at predetermined fluid pressure whereby said return valves may open and allow part of the operating fluid available to said jack to return to the reservoir.

6. In a pressure regulating selector valve for controlling a hydraulic jack in a hydraulic system in which separate jacks are connected with a pump and reservoir for operation under different fluid pressure, a valve body having fluid passages through which pressure fluid passes for operating a jack in the system, pressure seated poppet valves for controlling the flow of pressure fluid in certain of said passages, a pair of return valves for controlling the flow in certain of said passages of fluid which is returned from said jack to the reservoir, means for simultaneously opening a selected pressure valve and a selected return valve including a cam shaft engageable selectively with all of the valves, said return valves being mounted to seat against the working pressure in said passages, and springs for seating said return valves in such manner that one of the return valves will open responsive to pressures exceeding a predetermined pressure to return part of the pressure fluid to the reservoir while one of the pressure valves and the other of said return valves are held open by said means for simultaneously opening them.

7. In a pressure regulating selector valve for controlling a hydraulic jack in a hydraulic system in which separate jacks are connected with a pump and reservoir for operation under different fluid pressure, a valve body having fluid passages through which pressure fluid passes for operating a jack in the system, pressure seated poppet valves for controlling the flow of pressure fluid in certain of said passages, a pair of return valves for controlling the flow in certain of said passages of fluid which is returned from said jack to the reservoir, means for simultaneously opening a selected pressure valve and a selected return valve, said return valves being mounted to seat against the working pressure in said passages, springs for seating said return valves in such manner that one of the return valves will open responsive to pressures exceeding a predetermined pressure to return part of the pressure fluid to the reservoir while one of the pressure valves and the other of said return valves are held open by the means for simultaneously opening them, and means for hydraulically counter-balancing the return valves to reduce the hydraulic load on the springs therefor.

8. In a pressure regulating selector valve, a valve body having pressure valve receiving bores in spaced parallel relation and provided at corresponding points between the ends of said bores with enlargements, said body having a pressure fluid intake passage which is common to said enlargements, said bores having other enlargements at corresponding points therein axially spaced from the first enlargements, pressure seated poppet valves seated in said bores between the first and second named enlargements, said body having return valve receiving bores adjacent said pressure valve receiving bores and provided at corresponding points with enlargements which intersect the second named enlargements of the pressure valve receiving bores, there being passages common to said last named intersecting enlargements and opening on an outer surface of the valve body for connection with fluid lines for conveying pressure and return fluid with respect to a hydraulic jack and said valve body, said return valve receiving bores having other enlargements at corresponding points axially spaced above the first named enlargements therein, return valves mounted in the bores therefor between the enlargements in said bores for movement independently of the positions of the pressure seated valves, springs for seating said return valves against the pressure fluid and operating to permit said return valves to open whenever a predetermined fluid pressure is exceeded, said body having return fluid passages opening at points above the return valves into the second named enlargements of said return valve bores, said body being provided with a return fluid discharge passage with which said return fluid passages are connected, and a cam shaft common to said pressure and return valves for simultaneously engaging and opening selected pressure and return valves, one of the return valves which is not opened by said operating means being opened in response to said excess pressure of the operating fluid independently of the positions of the other valves.

9. In a pressure regulating selector valve, a valve body having pressure valve receiving bores in spaced parallel relation and provided at corresponding points between the ends of said bores with enlargements, said body having a pressure fluid intake passage which is common to said enlargements, said bores having other enlargements at corresponding points therein axially spaced from the first enlargements, pressure seated poppet valves seated in said bores between the first and second named enlargements, said body having return valve receiving bores adjacent said pressure valve receiving bores and provided at corresponding points with enlargements which intersect the second named enlargements of the pressure valve receiving bores, there being passages common to said last named intersecting enlargements and opening on an outer surface of the valve body for connection with fluid lines for conveying pressure and return fluid with respect to a hydraulic jack and said valve body, said return valve receiving bores having other enlargements at corresponding points axially spaced above the first named enlargements, therein, return valves mounted in the bores therefor between the enlargements in said bores and subject to automatic opening independently of the position of said pressure seated valves, springs for seating said return valves against the pressure fluid and operating to permit said return valve to open whenever a predetermined fluid pressure is exceeded, said body having return fluid passages opening at points above the return valves into the second named enlargements of said return valve bores, said body being provided with a return fluid discharge passage with which said return fluid passages are connected, and operating means common to said pressure and return valves for simultaneously opening selected pressure and return valves, one of the return valves which is not opened by said operating means being opened in response to said excess pressure of the operating fluid independently of the positions of the other valves, and means for hydraulically counter-balancing said return valves to reduce the hydraulic load on the springs which hold them seated.

10. In a pressure regulating hydraulic selector valve, a valve body having a pressure valve receiving bore and a return valve receiving bore, said pressure valve bore having enlargements axially spaced therein, a pressure valve seated between the enlargements in the bore therefor, said body having a pressure fluid intake passage opening into one of said enlargements, said return valve bore having axially spaced enlargements one of which intersects the other enlargement of the pressure valve bore, said body having a passage leading from said intersecting enlargements for conveying pressure and return fluid between a hydraulic jack and said intersecting enlargements, a return poppet valve seated between the enlargements in the bore therefor against the pressure fluid therein and being subject to automatic opening independently of the position of said pressure seated valves, a spring for holding said return valve seated and permitting it to open at predetermined pressure below the normal working pressure of the pressure fluid passing through the body while the pressure valve is opened or closed, and a cam means for selectively opening said valves.

11. In a pressure regulating hydraulic selector valve, a valve body having a pressure valve receiving bore and a return valve receiving bore, said pressure valve bore having enlargements axially spaced therein, a pressure valve seated between the enlargements in the bore therefor, said body having a pressure fluid intake passage opening into one of said enlargements, said return valve bore having axially spaced enlargements one of which intersects the other enlargement of the pressure valve bore, said body having a passage leading from said intersecting enlargements for conveying pressure and return fluid between a hydraulic jack and said intersecting enlargements, a return poppet valve seated between the enlargements in the bore therefor against the pressure fluid therein and being subject to opening independently of the position of said pressure seated valves, a spring for holding said return valve seated and permitting it to open at predetermined pressure below the normal working pressure of the pressure fluid passing through the body while the pressure valve is opened or closed, cam means for selectively opening said valves, and counter-balancing means for said return valve for reducing the hydraulic load on the spring therefor.

JACOB B. VAN DER WERFF.